(12) United States Patent
Mayston et al.

(10) Patent No.: US 7,887,922 B2
(45) Date of Patent: Feb. 15, 2011

(54) BEARINGS

(75) Inventors: Carolyn A. Mayston, Leicester (GB); Charan Preet Singh Johal, Leicester (GB)

(73) Assignee: Mahle Engine Systems Ltd. (GB)

( * ) Notice: Subject to any disclaimer, the term of this patent is extended or adjusted under 35 U.S.C. 154(b) by 613 days.

(21) Appl. No.: 10/561,650

(22) PCT Filed: Jun. 21, 2004

(86) PCT No.: PCT/GB2004/002673

§ 371 (c)(1), (2), (4) Date: Mar. 7, 2007

(87) PCT Pub. No.: WO2004/113749

PCT Pub. Date: Dec. 29, 2004

(65) Prior Publication Data

US 2007/0297704 A1 Dec. 27, 2007

(30) Foreign Application Priority Data

Jun. 20, 2003 (GB) .................................. 0314372.4

(51) Int. Cl.
- F16C 33/12 (2006.01)
- F16C 33/20 (2006.01)
- B32B 15/04 (2006.01)
- B32B 15/08 (2006.01)
- C08K 3/00 (2006.01)
- C08L 27/12 (2006.01)

(52) U.S. Cl. ........................ 428/457; 508/103; 508/106; 508/107; 524/401; 524/434; 524/439; 524/567

(58) Field of Classification Search .................. 428/457; 508/103, 106, 107; 524/434, 439, 567
See application file for complete search history.

(56) References Cited

U.S. PATENT DOCUMENTS

| 3,342,667 | A | * | 9/1967 | Berlinghof, Jr. ............. 428/418 |
| 4,497,764 | A | * | 2/1985 | Rey ........................... 264/261 |
| 5,013,219 | A | * | 5/1991 | Hicks et al. ................. 417/269 |
| 5,236,784 | A | | 8/1993 | Kobayashi et al. |
| 5,364,682 | A | * | 11/1994 | Tanaka et al. ............... 428/138 |
| 5,985,455 | A | * | 11/1999 | Tokunaga et al. ........... 428/413 |
| 6,726,994 | B1 | | 4/2004 | Araki et al. |
| 2003/0022797 | A1 | | 1/2003 | Oohira et al. |
| 2003/0134141 | A1 | * | 7/2003 | Okado et al. ................ 428/626 |

FOREIGN PATENT DOCUMENTS

| DE | 2917856 | * | 11/1980 |
| EP | 0 622 556 A1 | | 4/1993 |
| GB | 1183264 | | 1/1967 |
| GB | 1 434 712 | | 5/1976 |
| WO | WO 00/29210 | | 5/2000 |

OTHER PUBLICATIONS

International Search Report 3 page), 2004.

* cited by examiner

Primary Examiner—Tae H Yoon
(74) Attorney, Agent, or Firm—Rader, Fishman & Grauer PLLC

(57) ABSTRACT

A plain bearing having a sliding layer of a bearing material thereon is described, the bearing material comprising a polymer-based matrix selected from the group comprising modified epoxy resin and polyamide/amide resin, the matrix having contained therein at least one addition selected from the group comprising: metal powder in the range from 15 to 30 vol %; a fluoropolymer in the range from 1 to 15 vol %; ceramic powder in the range from 0.5 to 20 vol %; and, silica in the range from 2 to 15 vol %.

35 Claims, No Drawings

BEARINGS

The present invention relates to plain bearings and particularly, though not exclusively, to plain bearings having a strong backing layer, a layer of a first bearing material on the backing layer and a layer of a second bearing material on the layer of first bearing material.

Plain bearings for use as crankshaft journal bearings in internal combustion engines, for example, are usually semi-cylindrical in form and generally have a layered construction. The layered construction frequently comprises a strong backing material such as steel, for example, of a thickness in the region of about 1 mm or more; a lining of a first bearing material adhered to the backing and of a thickness generally in the range from about 0.1 to 0.5 mm; and often a layer of a second bearing material adhered to the surface of the first bearing material and having a thickness of less than about 25 µm. The surface of the second bearing material forms the actual running surface with a co-operating shaft journal surface. The backing provides strength and resistance to deformation of the bearing shell when it is installed in a main bearing housing or in a connecting rod big end for example. The first bearing material layer provides suitable bearing running properties if the layer of the second bearing material should be worn through for any reason. Thus, the layer of first bearing material provides seizure resistance and compatibility with the shaft journal surface and prevents the journal surface from coming into contact with the strong backing material. As noted above, whilst the first bearing material provides seizure resistance and compatibility, it is generally harder than the material of the second layer. Thus, it is inferior in terms of its ability to accommodate small misalignments between bearing surface and shaft journal (conformability) and in the ability to embed dirt particles circulating in the lubricating oil supply so as to prevent scoring or damage to the journal surface by the debris (dirt embedability).

The first bearing material may commonly be chosen from either aluminum alloy or copper alloy materials. Aluminum alloys generally comprise an aluminum or aluminum alloy matrix having a second phase of a soft metal therein. The soft metal phase may be chosen from one or more of lead, tin and bismuth. However, lead is nowadays a non-preferred element due to its environmental disadvantages. Copper based alloys such as copper-lead and leaded bronzes are also likely to fall into disfavour eventually due to these environmental considerations and may be replaced by lead-free copper alloys, for example.

The second bearing material layer which co-operates with the shaft journal is also known as an overlay layer and has been generally formed by a relatively very soft metal layer. An example is lead-tin alloy deposited, for example, by electrochemical deposition. Such alloys, however, in addition to being undesirable environmentally are also prone to wear in modern highly loaded engine applications. In order to replace such overlay alloys with lead-free, more wear resistant alternatives much work has been carried out on soft aluminum alloys having relatively high tin contents and which are deposited by techniques such a cathodic sputtering, for example. A disadvantage of such techniques is that such bearing layers are expensive to produce, the process being an essentially small batch process due to the vacuum sputtering equipment required.

In order to solve the problems electro-deposited lead-tin alloys and later sputtering techniques, some workers have turned to polymer based overlays for oil lubricated, hydrodynamically loaded journal bearings.

JP-A-11106775 describes an overlay having a polymer matrix of a polyamidoimide resin and having 20 to 69.7 vol % of a self lubricating phase therein. The examples show 28 to 63 vol % of the self lubricating phase (molybdenum disulphide). The self lubricating phase may be selected from molybdenum disulphide, graphite, tungsten disulphide and the like.

JP-A-11106779 describes a similar material, the examples in this case containing from 30 to 70 vol % of molybdenum disulphide, but where the resin matrix has a tensile strength in excess of 100 Mpa.

However, a problem with such high contents of self lubricating materials of the types described is that whilst the frictional properties and the wear resistance of the material may be adequate, the fatigue strength is frequently impaired.

The present invention has been made to overcome the disadvantages of the prior art.

According to a first aspect of the present invention there is provided a plain bearing having a sliding layer of a bearing material thereon, the bearing material comprising a polymer-based matrix selected from the group comprising modified epoxy resin and polyimide/amide resin, the matrix having contained therein at least one addition selected from the group comprising: metal powder in the range from 15 to 30 vol %; a fluoropolymer powder in the range from 1 to 15 vol %; ceramic powder in the range from 0.5 to 20 vol %; and, silica in the range from 2 to 15 vol %.

Bearings according to the present invention are intended to operate in oil lubricated, hydro-dynamically loaded applications such as internal combustion engine main and connecting rod bearings where the pattern of loading is extremely non-uniform, ranging from low load levels to very high peak loads within one complete engine cycle. Thus, bearing materials for such applications must possess not only high strength per se, but also high fatigue strength to withstand the cyclic loading to which they are subjected and also very high levels of adhesive A bond strength to the substrate on which the material is deposited.

In the applications intended, the temperatures experienced are generally higher than those to which plastics bearing materials are normally subjected. Moreover, the applications are oil lubricated thus, the plastics materials must be resistant to the hot chemical additives employed in modern oils to maintain their lubricating qualities under the arduous conditions pertaining in modern high-performance engines.

In this specification the term "modified epoxy resin" is intended to cover a resin comprising from 30 to 60 w/w epoxy resin and 70 to 40 w/w phenolic resin based on solids to solids content. The phenolic component of the matrix resin provides good heat and chemical resistance whereas the epoxy component whilst also being very chemically resistant also enhances flexibility of the bearing material layer and promotes improved adhesion to the substrate on which it is deposited.

The epoxy resin component itself may comprise two or more different epoxy resins.

The modified epoxy resin may also further contain amino resin so as to form an epoxy-amino-formaldehyde resin. The amino resin component promotes curing and cross-linking of the epoxy resin and also promotes adhesion of the polymer to the substrate. Chemical resistance of the polymer is also enhanced by the amino resin component.

Further additions of a vinyl resin may also be made. The vinyl resin component has a softening effect on the resin matrix and endows the overlay layer with conformability enabling it to deform to accommodate minor misalignments between shaft journal and bearing surface, for example.

An example of a typical modified epoxy resin matrix may comprise: 53 wt % epoxy/phenolic resin; 35 wt % amino resin; 12 wt % vinyl resin. This resin matrix composition is merely exemplary and the broader compositional ranges may vary significantly around these figures.

In the case of the polyimide/amide matrix resin, the polyimide is a majority constituent. Polyimide resins have outstanding chemical resistance and also outstanding heat resistance, being able to withstand temperatures up about 400° C. Moreover the adhesive characteristics of polyimides to a substrate are also excellent. The polyimide/amide resin may also contain a vinyl resin component which has a similar conformability endowing effect as with the modified epoxy resin matrix.

A typical polyimide/amide matrix composition may comprise: 84 wt % polyimide/amide resin; 16 wt % vinyl resin. This composition is merely exemplary and as with the epoxy resin matrix the broader compositional ranges may vary significantly around these figures.

The metal powder constituent is present due to the benefits conferred in terms of wear resistance in accommodating high bearing loads and also in improving the impact resistance ability of the bearing material in view of high firing loads generated during the operation of internal combustion engines.

The metal powder constituent may comprise a single powder of a pure metal such as aluminum, copper, silver, tungsten, nickel, for example, or may comprise a metal powder alloy such as brass, bronze, stainless steel, for example.

The metal powder constituent may itself comprise mixtures of different metal or metal alloy powders in preferred proportions. In one embodiment of a bearing material according to the present invention, the metal powder may comprise a mixture of aluminum and tungsten metals in the proportion of 40/60% Al/W by volume. However, the relative proportions may range between 30/70 and 70/30 Al/W depending upon the actual engine bearing application in question.

The powder morphology of each constituent may vary. In the example described above the W particles are nodular or rounded and this morphology for the very hard W particles has improved wear resistance due to a uniform distribution of these hard particles within the matrix. However, in general, flake or platelet type particle morphology is generally preferred even for the hard particles. Stainless steel powder having flake or platelet morphology has been successfully used.

The softer Al powder constituent, and other softer metal powders such as brass, copper, silver and the like, may preferably be of flake or platelet morphology as this provides a greater surface area and which particles tend to align themselves generally with the plane of the bearing material layer and so provide a high temperature lubricating effect in use. Alternatively, the Al constituent may also be of nodular particle morphology as this has also been found to be beneficial in some situations.

In the case of the softer metal powders having platelet morphology, it is preferred that the generally pure metal such as Al, Ag, or Cu, for example, is employed as the thermal conductivity of these materials is beneficial in conducting heat from the bearing into the housing in which it is held and also to the circulating lubricating oil for bearing cooling purposes.

The range of total metal powder content may be from 15 to 30 vol %. Below 15 vol % the improvement in wear resistance is insufficient whereas above 30 vol % the bearing material becomes too hard and porosity tends to be produced in the layer which is detrimental to fatigue strength and adhesion of the material to the substrate.

Particle size of the metal powder constituent may preferably lie in the range from 0.5 to 10 μm and more preferably between 0.5 and 5 μm.

Alternative metal powder constituent combinations to Al/W described above may include Al/Sn; Ag/Cu; Cu/W. However, it will be appreciated by those skilled in the art that other combinations may be employed, e.g. Ag/W and also that the individual powders may not necessarily be elements but may also be alloy particles such as stainless steel, brasses or bronzes, for example. Whilst lead or lead-containing materials are beneficial for bearing properties, such materials are now non-preferred due to their environmental and safety disadvantages.

A fluoropolymer may be included in the bearing material for its beneficial effect on material frictional properties and its self lubricating effect. A suitable material may be polytetrafluoroethylene (PTFE), however, other fluoropolymers may be used but the performance is generally inferior to PTFE.

A suitable range for fluoropolymer content may be from 1 to 15 vol % with 2 to 8 vol % being a preferred range. Too high a content of fluoropolymer reduces the matrix hardness and strength by an unacceptable degree.

Particle size of the fluoropolymer desirably lies in the range from 1 to 5 μm. A size range of 2 to 3 μm is preferred.

The term "ceramic" powder is used in a general sense, to include additions of non-metallic, inorganic particulate materials which serve to improve the wear resistance and strength of the polymer matrix. Examples of such materials may include oxides, nitrides, carbides, sulphides, silicates and the like. Tests have been conducted using alumina, talc and glass beads as additions to the polymer matrix.

Of the various alternative ceramic powders which have been tested, three appear to be particularly useful in respect of their effects on various properties, these materials are: alumina, boron nitride and talc.

Alumina appears to have a beneficial effect in that it gently polishes the surface of the cooperating shaft journal to render the journal surface less abrasive to the bearing surface thereby decreasing wear thereof.

Boron nitride appears to be particularly beneficial, especially where the particle morphology is in platelet form. Tests indicate that boron nitride of hexagonal crystal structure in platelet form co-operates with the lubricant to provide enhanced compatibility resulting in better seizure and scuffing resistance. Contrary to this, tests with boron nitride of cubic crystal structure in spherical or nodular particle form have resulted in seizures under fatigue testing.

Talc, whilst being a very soft material, in contrast to boron nitride, for example, appears to reinforce the polymer matrix especially at the edges adjacent the axial bearing ends where some shrinkage otherwise occurs during curing of the polymer resulting in greater edge wear in use when talc is not present. However, it has also been found that boron nitride also fulfills this function of minimising shrinkage and wear effects at bearing edges. Therefore, the use of both talc and boron nitride together is not considered necessary and the use of boron nitride is to be preferred due to its greater beneficial effect on performance.

Content of ceramic powder may range from 0.5 to 20 vol %. Above 20 vol % the material becomes too hard and inflexible whereas below 0.5 vol % the beneficial effects on wear and matrix strength are not fully realised. A content of 2 to 20 vol % is preferred.

Silica may be present in the range from 1 to 20 vol %.

Silica is distinguished from the ceramic powder additions discussed above as it is not added as a powder and in some formulations has further, more far reaching, effects on the polymer material and bearing as a whole than do the ceramic powder additions above. Addition of silica may be made to the epoxy-based matrix material in the range from 2 to 15 vol %. Silica has the effect of strengthening the matrix and has a beneficial effect on wear resistance. Below 2 vol % the effects are not sufficiently realised whereas above 15 vol % the matrix becomes too hard and inflexible. 4 to 10 vol % is a preferred range.

The type of silica is important as this has a significant effect on the bearing characteristics of the material. Preferably, the particle size of silica should be in the range from 20 to 50 nanometers. The type of silica used actually assists the adhesion of the polymer layer to the substrate. The chemical form of silica used possesses "—OH" groups on the surface of the particles and which bond to a metallic substrate surface and thus, improve both the strength and the fatigue resistance of the material by the improved bond strength. Thus, the silica used is not merely a free particle within a matrix but a "reactive" form of silica in which the —OH groups are reactive and polar and which thus improve adhesion.

Desirably, the total content of solids additions to the plastics matrix should not exceed 35 vol % irrespective of the total individual constituent contents specified above. In general, the total solids content (pigment volume content, PVC) of additions to the matrix may preferably lie in the range from 10 to 30 vol % and, more preferably within the range of 20 to 30 vol %.

Preferably, the bearing material according to the present invention also includes a further addition of a separate adhesion promoting agent. Such adhesion promoting materials may be based on silane materials and are effective by means of one end of the silane molecule bonding by cross linking with the polymer matrix and the other end of the molecule, which possesses a high proportion of "—OH" groups bonding with the metal substrate. An addition in the range of 0.2 to 3 vol % is preferred. Examples of suitable materials may include bis-(gamma-trimethoxysilylpropyl) amine and gamma-glycidoxypropyltrimethoxysilane.

The bearing according to the present invention may comprise one of several different forms: for example, the strong backing material may be steel and have deposited thereon a layer of a first bearing material, the first bearing material having deposited thereon a second, polymer-based, bearing material according to the present invention. In this instance the first bearing material may comprise a metallic bearing material based on an aluminum alloy or a copper alloy, for example.

In some circumstances the layer of the first bearing material may itself constitute the strong backing material per se. In this instance a tin-bronze material may be used, for example.

Where the polymer-based bearing material according to the present invention is deposited upon a layer of a first bearing material, then it may have a thickness in the range from about 5 to 40 μm. A thickness range of 10 to 30 μm is, however, preferred.

It is also envisaged that the polymer-based bearing material of the present invention may be deposited directly upon a strong backing material which itself is not a bearing material in the recognised sense. An example of this would be a steel backing with a layer of the polymer-based bearing material deposited thereon. In such a construction, the thickness of the polymer-based bearing material according to the present invention may be greater than where there is an intervening layer of first bearing material. In this construction, the thickness of the layer of polymer-based bearing material may lie in the range from 40 to 100 μm. A preferred range may be from 40 to 70 μm.

The polymer-based bearing materials of the present invention may be applied as a liquid to the substrate. Moreover, the polymer-based materials may be thinned with appropriate solvents and sprayed by known techniques onto a desired substrate. Control of layer thickness is good and thicker layers may be formed by the spray deposition of a plurality of layers, for example.

Where the method of deposition is by the spraying of a thinned layer or layers, the spayed material may first be given a low temperature heat treatment to remove solvent followed by a further consecutive heat treatment to cure the polymer matrix.

In order that the present invention may be more fully understood, examples will now be described by way of illustration only.

Two different materials were made for testing based on the epoxy/phenolic material and on the polyimide/amide material.

The compositions of these materials are set out in Table 1 below.

Concentrations of materials by volume, in cured product, based on epoxy/phenolic and PI resin.

TABLE 1

| | Particle shape | Approximate Particle size | Formulation Ref | | | | |
|---|---|---|---|---|---|---|---|
| | | | 01-008 S1 | 01-008 H1 | 01-008 Y | 01-008 K1 | 01-008 L1 |
| Raw Materials | | | | | | | |
| Epoxy/Phenolic | | | | 69.3 | | | |
| Polyimide/polyamide | | | 79.303 | | 80.75 | 69.90 | 69.90 |
| Tungsten | Spherical | 5 micron | 6.58 | 4.5 | 9 | | |
| Aluminium | Spherical | 5 micron | 4.48 | 18.09 | | | |
| Silica | Spherical | 50 nanometers | | 5.35 | 4.1 | | |
| Polytetrafluoroethylene | Spherical | 1-3 micron | 3.0 | 1.8 | | 6.3 | 6.3 |
| Aluminium | Irregular | 5 microns | | | 6.1 | 9.3 | 9.35 |
| Ceramic beads | Spherical | 5-10 microns | | | | 14.4 | 14.4 |
| Aluminium oxide | Irregular | 1-3 micron | 5.65 | | | | |
| Bis(gamma-trimethoxysilylpropyl)amine | | | | 0.96 | 0.96 | | |

TABLE 1-continued

| | | | | | | | |
|---|---|---|---|---|---|---|---|
| Polyester dimethylpolysiloxane | | | 0.027 | | | | 0.05 |
| Processing parameters | | | | | | | |
| Curing temperature | | | 190° C. | 190° C. | 190° C. | 190° C. | 190° C. |
| Curing time | | | 30 min | 20-30 min | 30 min | 30 min | 30 min |
| Thickness on Copper alloys & Aluminium | | | 15 μm | 15 μm | 15 μm | 15 μm | 15 μm |
| Thickness on steel | | | 50-100 μm | 50-100 μm | 50-100 μm | 50-100 μm | 50-100 μm |
| Solvent content | | | | | | | |
| Solvent content ml/L | | | Approx 700 | Approx 725 | Approx 870 | Approx 825 | Approx 780 |

| | Particle shape | Approximate Particle size | Formulation Ref | | | | |
|---|---|---|---|---|---|---|---|
| | | | 01-008 327 | 01-008 326 | 01-008 C1 | 01-008 M1 | 01-008 R2 |
| Raw Materials | | | | | | | |
| Epoxy/Phenolic Polyimide/polyamide | | | 61.75 | 79.87 | 61.75 | 79.87 | 65.26 |
| Tungsten | Spherical | 5 micron | 17.25 | 9.34 | 17.25 | 9.34 | |
| Aluminium | Spherical | 5 micron | 11.6 | | 11.6 | | 10.4 |
| Tin | irregular | 30 microns | | | | | |
| Polytetrafluoroethylene | Spherical | 1-3 micron | 7.7 | 4.24 | 7.7 | 4.24 | 7.4 |
| Aluminium | Irregular | 5 microns | | 6.3 | | 6.3 | |
| Ceramic beads | Spherical | 5-10 microns | | | | | |
| Aluminium oxide | Irregular | 1-3 micron | | | | | 6.0 |
| Silica | Irregular | 10-13 nm | | | | | 1.09 |
| Stainless Steel | Lamellar | Approx 5 microns | | | | | 9.3 |
| Bis(gamma-trimethoxysilylpropyl)amine | | | | | | | |
| Polyester dimethylpolysiloxane | | | 1.7 | 0.19 | 1.7 | 0.19 | 0.55 |
| Processing parameters | | | | | | | |
| Curing temperature | | | 190° C. | 185° C. | 190° C. | 185° C. | 190° C. |
| Curing time | | | 30 min | 20 min | 30 min | 20 min | 30 |
| Thickness on Copper alloys & Aluminium | | | 15 μm | 15 μm | 15 μm | 15 μm | 15μ |
| Thickness on steel | | | 50-100 μm | 50-100 μm | 50-100 μm | 50-100 μm | 50-100 μm |
| Solvent content | | | | | | | |
| Solvent content ml/L | | | Approx 870 | Approx 760 | Approx 870 | Approx 760 | Approx 760 |

The concentrations of additions to the matrix are by volume % in the cured material based on the density of the particular matrix polymer in each case.

Reference in "processing parameters" to copper alloys and aluminum alloys refers to the substrate material on which the polymer is deposited. The substrate in all cases is further provided with a strong backing material of steel.

Bearings were formed from coated substrates and tested for wear in a known "Viper" wear test rig and for fatigue strength in a known "Sapphire" fatigue test rig. Test conditions for each type of test are given below.

Viper wear tests are accelerated wear tests and have conditions:

| | |
|---|---|
| Load | 8 kgs |
| Shaft diameter | 46.25 mm |
| Shaft roughness | 0.2 Ra |
| Shaft speed | 500 rev/min |
| Oil temperature | 120° C. |
| Test duration | 10 to 360 mins. |

The bearings were weighed before and after each test and the weight loss taken to represent resistance to wear. The weight losses were converted into volume losses to permit accurate comparisons of wear behaviour.

Sapphire fatigue tests were conducted on half bearing samples comprising a steel backed, cast copper-lead alloy bearing metal lining and having an overlay coating according to the present invention sprayed in the bore thereof. Test rig temperature was 80° C.; running periods of 20 hrs at each load were used with load increments of 7 kgs at each time period. Results of the tests are given below in Table 2.

TABLE 2

| Material | Coating Thickness | PVC | Substrate | Wear Volume loss mm³ | Time minutes | Fatigue strength MPa | Time Hours |
|---|---|---|---|---|---|---|---|
| Modified Epoxy Al/W H1 | 25 μm | 30% | VP2 | 0.122 | 60 | 76 | 100 |

TABLE 2-continued

| Material | Coating Thickness | PVC | Substrate | Wear Volume loss mm³ | Time minutes | Fatigue strength MPa | Time Hours |
|---|---|---|---|---|---|---|---|
| Polyimide Al/W 327 | 12 μm | 30% | VP2 | 0.505. | 60 | 103 | 180 |
| Polyimide Al/W 326 | 18 μm | 30% | VP2 | 0.501 | 60 | 83 | 120 |
| Polyimide Al/W C1 | 10 μm | 30% | VP2 | 0.463 | 60 | 90 | 140 |
| Polyimide Al/W C1 | 25 μm | 30% | VP2 | 0.463 | 60 | 90 | 140 |
| Polyimide Al/W M1 | 15 μm | 20% | F90 | 0.122 | 60 | 76 | 100 |
| Polyimide Al/w Y | 15 μm | 15% | VP2 | 0.122 | 60 | 103 | 180 |
| Polyimide Al/W/Ceramic K1 | 15 μm | 20% | F90 | 0.027 | 60 | 83 | 120 |
| Polyimide Al/W/Ceramic L1 | 15 μm | 20% | F90 | 0.022 | 60 | 76 | 100 |
| Polyimide Al/W/Alumina S1 | 15 μm | 20% | VP2 | 0.24 | 60 | 76 | 100 |
| Polyimide Al/Stainless steel/Alumina R2 | 15 μm | 20% | VP2 | 0.00 | 60 | 97 | 160 |

Table 3 below gives comparative data on known metallic overlays and shows Viper (wear volume loss) and Sapphire (fatigue strength) results on known metallic electro-deposited overlay materials.

TABLE 3

| Material | Coating Thickness | Substrate | Wear Volume loss mm³ | Time Mins | Fatigue strength MPa | Time hrs |
|---|---|---|---|---|---|---|
| Pb—10Sn—2Cu | 12 μm | VP2 | 7.8 | 12 | 69 | 80 |
| Pb—In | 12 μm | VP2 | 10.2 | 12 | 76 | 100 |
| Fb—10Sn-1 Alumina | 12 μm | VP2 | 0.5 | 60 | 83 | 120 |

The polymer overlay compositions were all sprayed onto a copper-based (VP2) or aluminum-based (F90) bearing alloy.

The column headed "PVC", denotes the total "pigment volume content" in the matrix and comprises metal powder, silica, fluoropolymer and all other additions in the final, ascured and tested bearing material.

It may be seen that the wear and fatigue resistance of polymer based overlays according to the present invention and as set out in Tables 1 and 2 are in most cases superior to metallic overlays as set out in Table 3. Only the composite overlay comprising a co-electrodeposited alumina phase (Pb-10Sn-1alumina) in the overlay matrix has wear and fatigue resistance approaching that of the polymer overlays according to the present invention. However, the prior art metallic overlays are costly to produce, especially the alumina containing composite material and are also environmentally undesirable being based on a lead matrix. Overlays according to the present invention may be made up in bulk and applied with relative ease by known, well understood and controllable spraying processes.

Tables 4 to 7 below give the compositions of some additional bearing overlay layers which have been tested under the Viper wear test regime discussed above. Table 9 shows the results of those wear tests. As will be immediately apparent that the total wear volume loss is extremely low

TABLE 4

| Material 151B - L5 | Wt of materials/ gms | % wt | Volume of materials/ mls | Volume Solids | vol % in dried layer |
|---|---|---|---|---|---|
| Epoxy resin | 103.60 | 23.20 | 21.09 | 7.38 | 38.3 |
| Amino | 40.30 | 9.03 | 9.03 | 5.42 | 22.1 |
| Vinyl resin | 9.00 | 2.02 | 2.02 | 2.02 | 10.5 |
| Resin % | | | | | 70% |
| Talc | 17.50 | 3.92 | 1.37 | 1.37 | 7.1 |
| Al | 39.10 | 8.75 | 0.37 | 0.24 | 1.3 |
| Stainless steel | 48.70 | 10.90 | 1.55 | 1.4 | 7.3 |
| PTFE | 6.40 | 1.43 | 0.65 | 0.65 | 3.4 |
| $Al_2O_3$ | 12.80 | 2.86 | 0.79 | 0.79 | 4.1 |
| Fillers | | 62.11 | | 19.27 | |
| PVC | | | | | 30.4% |

TABLE 5

| Material 151A - K5 | Wt of material gms | % Wt | Volume of materials/ mls | Volume solids | vol % in dried layer |
|---|---|---|---|---|---|
| Epoxy Resin | 103.60 | 21.46 | 19.5 | 6.8 | 34.64 |
| Amino | 40.30 | 8.35 | 8.35 | 5.1 | 25.98 |
| Vinyl resin | 9.00 | 1.86 | 1.86 | 1.86 | 9.47 |
| Resin % | | | | | 70.09% |
| Talc | 17.50 | 3.62 | 1.27 | 1.27 | 6.46 |
| Al | 39.40 | 8.16 | 3.02 | 1.96 | 9.98 |
| Tungsten | 121.80 | 25.22 | 1.30 | 1.30 | 6.62 |
| PTFE | 6.40 | 1.32 | 0.6 | 0.6 | 3.05 |
| $Al_2O_3$ | 12.80 | 2.65 | 0.74 | 0.74 | 3.76 |
| Fillers | | 40.97 | | | |
| PVC | | | | | 29.87% |

TABLE 6

| Material 152A - O5 | Wt of materials/ gms | % wt | Volume of materials/ mls | Volume Solids | vol % in dried layer |
|---|---|---|---|---|---|
| Polyimide | 56.00 | 35.12 | 29.3 | 12.9 | 56.87 |
| Vinyl resin | 4.80 | 3.01 | 3.01 | 3.01 | 13.27 |
| Resin % | | | | | 70.14% |
| Talc | 6.60 | 4.13 | 1.44 | 1.44 | 6.34 |
| Al | 12.15 | 7.61 | 2.8 | 1.82 | 8.024 |
| Stainless steel | 15.00 | 9.4 | 1.34 | 1.20 | 5.29 |
| PTFE | 2.50 | 1.56 | 0.71 | 0.71 | 3.13 |
| $Al_2O_3$ | 9.20 | 5.76 | 1.6 | 1.6 | 7.05 |

TABLE 6-continued

| Material 152A - O5 | Wt of materials/ gms | % wt | Volume of materials/ mls | Volume Solids | vol % in dried layer |
|---|---|---|---|---|---|
| Fillers | | 28.46 | | | |
| PVC | | | | | 29.84% |

TABLE 7

| Material 152B - P5 | Wt of material/ gms | % wt | Volume of materials/ mls | Volume solids | vol % in dried layer |
|---|---|---|---|---|---|
| Polyimide | 56.00 | 30.82 | 25.68 | 11.29 | 56.76 |
| Vinyl resin | 4.80 | 2.64 | 2.64 | 2.64 | 13.27 |
| Resin % | | | | | 70.03% |
| Talc | 6.60 | 3.63 | 1.27 | 1.27 | 6.38 |
| Al | 12.15 | 6.68 | 2.47 | 1.60 | 8.04 |
| Tungsten | 37.25 | 20.50 | 1.06 | 1.06 | 5.32 |
| PTFE | 2.50 | 1.37 | 0.62 | 0.62 | 3.11 |
| $Al_2O_3$ | 9.20 | 5.06 | 1.41 | 1.41 | 7.09 |
| Fillers | | 70.7 | | | |
| PVC | | | | | 29.94% |

TABLE 8

| Material 151 - K6 | Wt of material/gms | % Wt | Volume of materials/ mls | Volume Solids | vol % in dried layer |
|---|---|---|---|---|---|
| Epoxy 1 | 62.10 | 13.17 | 11.97 | 4.2 | 18.3 |
| Epoxy 2 | 29.00 | 6.15 | 5.6 | 4.2 | 18.3 |
| Amino | 48.25 | 10.23 | 10.23 | 6.14 | 26.9 |
| Vinyl resin | 7.20 | 1.53 | 1.53 | 1.53 | 7.7 |
| Resin % | | | | | 71.9% |
| Boron Nitride | 15.00 | 3.18 | 1.51 | 1.51 | 6.76 |
| Al | 46.20 | 9.8 | 3.62 | 2.36 | 10.56 |
| Tungsten | 92.10 | 19.53 | 1.01 | 1.01 | 4.52 |
| PTFE | 6.80 | 1.44 | 0.65 | 0.65 | 2.91 |
| $Al_2O_3$ | 12.80 | 2.71 | 0.75 | 0.75 | 3.36 |
| Fillers | | 36.66 | | | |
| PVC | | | | | 28.1% |

TABLE 9

| Material | Coating Thickness (μm) | PVC | Wear Volume loss ($mm^3$) | Test Duration (mins) |
|---|---|---|---|---|
| 151B-L5 | 15 | 30 | 0.024 | 60 |
| 151A-K5 | 15 | 29.9 | 0.18 | 60 |
| 152A-O5 | 15 | 29.8 | 0 | 60 |
| 152B-P5 | 15 | 29.9 | 0 | 60 |

It may be seen from Table 9 that the wear rate of the material shown in Tables 4 to 7 is very low and even in the worst case is about 35% that of the best comparable metallic overlay comprising alumina.

The invention claimed is:

1. A plain bearing comprising: a strong backing material substrate, the substrate having one of (i) a sliding layer of a polymer-based bearing material thereon, the polymer-based bearing material comprising a polymer-based matrix and being adhered directly to the substrate by adhesive properties of the polymer-based matrix material; and (ii) a layer of a metallic bearing material thereon, with a sliding layer of a polymer-based bearing material on the metallic bearing material thereon, the polymer-based bearing material comprising a polymer-based matrix and being adhered directly to the metallic bearing material by adhesive properties of the polymer-based matrix material; the polymer-based matrix material selected from the group consisting of a modified epoxy resin and a polyimide/amide resin, the matrix resin having contained therein particles of a metal powder in the range from 15 to 30 vol % and particles of a fluoropolymer content lying in the range from approximately 2 to 8 vol %, and selectively including an addition selected from the group consisting of a ceramic powder in the range from 0.5 to 20 vol %, and, silica in the range from 2 to 15 vol %, wherein a total solids content of the polymer-based bearing material in the form of the particles of the metal powder, the particles of the fluoropolymer content, any ceramic powder, and any silica does not exceed 35 vol %.

2. A plain bearing according to claim 1, wherein the modified epoxy resin consists of from 30 to 60 w/w epoxy resin and 70 to 40 w/w phenolic resin based on solid to solids content.

3. A plain bearing according to claim 1, wherein the modified epoxy resin also contains an amino resin.

4. A plain bearing according to claim 1, wherein the modified epoxy resin also contains vinyl resin.

5. A plain bearing according to claim 1, wherein the modified epoxy resin is prepared from an uncured epoxy resin matrix mixture, and the uncured epoxy resin matrix mixture contains two or more distinct epoxy resin constituents.

6. A plain bearing according to claim 1, wherein polyimide is a majority constituent in the polyimide/amide matrix resin.

7. A plain bearing according to claim 6, wherein the polyimide/amide resin also contains a vinyl resin constituent.

8. A plain bearing according to claim 1, wherein the metal powder is selected from the group consisting of tungsten, aluminum, copper, silver, tin, brass, bronze, stainless steel, and nickel.

9. A plain bearing according to claim 8, wherein the metal powder comprises a mixture of different metal powders.

10. A plain bearing according to claim 9, wherein the metal powder consists of a mixture of aluminum and tungsten metals, and the proportion of aluminum to tungsten is in the range between 30/70 and 70/30 Al/W volume %.

11. A plain bearing according to claim 10, wherein the proportion of Al to W is approximately 40/60% Al/W by volume.

12. A plain bearing according to claim 10, wherein the morphology of the W particles is nodular or rounded.

13. A plain bearing according to claim 10, wherein the Al powder is of flake or platelet morphology.

14. A plain bearing according to claim 1, wherein the metal powder comprises metal powder particles having a particle size in the range from 0.5 to 10 μm.

15. A plain bearing according to claim 1, wherein the metal powder is selected from the group consisting of a mixture of aluminum and tin, a mixture of silver and copper, a mixture of copper and tungsten, and a mixture of silver and tungsten.

16. A plain bearing as claimed in claim 1, wherein the metal powder comprises metal alloy particles.

17. A plain bearing according to claim 16, wherein the metal alloy is selected from the group consisting of stainless steel, aluminum alloys, brass, and bronze.

18. A plain bearing according to claim 1, wherein the fluoropolymer is polytetrafluoroethylene.

19. A plain bearing according to claim 1, wherein the ceramic powder is selected from the group consisting of oxides, nitrides, carbides, silicates and sulfides.

20. A plain bearing according to claim 1, wherein the ceramic powder content lies in the range from approximately 2 to 20 vol %.

21. A plain bearing according to claim 1, wherein the silica content lies in the range from approximately 4 to 10 vol %.

22. A plain bearing according to claim 1, wherein the silica comprises particles having a particle size from 20 to 50 nanometers.

23. A plain bearing according to claim 1, wherein the silica comprises reactive silica particles, each reactive silica particle having a surface with which at least one "—OH" group is associated.

24. A plain bearing according to claim 1, wherein the solids content added to the polymer-based matrix is from approximately 10 to 30 vol %.

25. A plain bearing according to claim 1, further including a silane material in the range of approximately 0.2 to 3 vol %.

26. A plain bearing according to claim 25, wherein the silane material is selected from the group consisting of: bis-(gamma-trimethoxysilylpropyl)amine and gamma-glycidoxypropyltrimethoxysilane.

27. A plain bearing according to claim 1, wherein the layer of-metallic bearing material is selected from a group consisting of an aluminum alloy and a copper alloy.

28. A plain bearing according to claim 1, wherein the polymer-based bearing material layer has a thickness of approximately 5 to 40 μm.

29. A plain bearing according to claim 1, wherein the bearing material is deposited directly upon a strong backing material.

30. A plain bearing according to claim 29, wherein the bearing material has a thickness of from approximately 40 to 100 μm.

31. A plain bearing according to claim 1, wherein the polymer-based bearing material is applied as a liquid to the substrate.

32. A plain bearing according to claim 31, wherein the liquid is sprayed.

33. A plain bearing comprising: a strong backing material substrate, the substrate having one of (i) a sliding layer of a polymer-based bearing material thereon, the polymer-based bearing material comprising a polymer-based matrix and being adhered directly to the substrate by adhesive properties of the polymer-based matrix material, the polymer-based matrix; and (ii) a layer of a metallic bearing material thereon with a sliding layer of a polymer-based bearing material on the metallic bearing material, the polymer-based bearing material comprising a polymer-based matrix and being adhered directly to the metallic bearing material by adhesive properties of the polymer-based matrix material; the polymer-based matrix material selected from the group consisting of a modified epoxy resin and a polyimide/amide resin, the matrix resin having contained therein particles of a metal powder in the range from 15 to 30 vol % and particles of a fluoropolymer content lying in the range from approximately 2 to 8 vol %, and selectively including an addition selected from the group consisting of a ceramic powder in the range from 0.5 to 20 vol %, and, silica in the range from 2 to 15 vol %.

34. The plain bearing according to claim 33, wherein the layer of the metallic bearing material is positioned between the strong backing material substrate and the sliding layer of the polymer-based bearing material.

35. A plain bearing comprising: a strong backing material substrate, the substrate having a sliding layer of a polymer-based bearing material thereon and being adhered to the substrate by adhesive properties of the polymer-based matrix material, the polymer-based bearing material comprising a polymer-based matrix selected from the group consisting of a modified epoxy resin and a polyimide/amide resin, the matrix resin having contained therein particles of a metal powder in the range from 15 to 30 vol % and particles of a fluoropolymer content lying in the range from approximately 1 to 15 vol %, and selectively including an addition selected from the group consisting of a ceramic powder in the range from 0.5 to 20 vol %, and, silica in the range from 2 to 15 vol %, wherein the polymer-based bearing material includes a total content of solids addition not to exceed 35 vol % in the form of the particles of the metal powder, the particles of the fluoropolymer content, any ceramic powder, and any silica.

* * * * *